US010101476B2

(12) United States Patent
Sakumura et al.

(10) Patent No.: US 10,101,476 B2
(45) Date of Patent: Oct. 16, 2018

(54) X-RAY DATA PROCESSING APPARATUS AND METHOD AND PROGRAM THEREFOR

(71) Applicant: Rigaku Corporation, Tokyo (JP)

(72) Inventors: Takuto Sakumura, Hachioji (JP); Yasukazu Nakaye, Ome (JP)

(73) Assignee: RIGAKU CORPORATION, Tokyo (JP)

( * ) Notice: Subject to any disclaimer, the term of this patent is extended or adjusted under 35 U.S.C. 154(b) by 261 days.

(21) Appl. No.: 15/133,431

(22) Filed: Apr. 20, 2016

(65) Prior Publication Data

US 2016/0377748 A1 Dec. 29, 2016

(30) Foreign Application Priority Data

Jun. 24, 2015 (JP) ................................ 2015-127041

(51) Int. Cl.
| | | |
|---|---|---|
| *G01T 1/00* | (2006.01) | |
| *G01T 7/00* | (2006.01) | |
| *G01T 1/17* | (2006.01) | |
| *G01T 1/24* | (2006.01) | |

(52) U.S. Cl.
CPC ............... *G01T 7/005* (2013.01); *G01T 1/17* (2013.01); *G01T 1/243* (2013.01)

(58) Field of Classification Search
CPC ........... G01T 1/17; G01T 1/243; G01T 7/005; G01T 1/246
See application file for complete search history.

(56) References Cited

U.S. PATENT DOCUMENTS

| | | | | |
|---|---|---|---|---|
| 2011/0101231 A1* | 5/2011 | Rundle | ................... | G01T 7/005 250/370.09 |
| 2014/0050301 A1* | 2/2014 | Liu | ........................ | G06T 5/009 378/62 |
| 2014/0105370 A1* | 4/2014 | Yamakawa | ............ | A61B 6/025 378/207 |

OTHER PUBLICATIONS

Kraft et al. "Performance of single-photon-ounting PILATUS detector modules", Journal of Synchrotron Radiation, (2009), 16, pp. 368-375.

(Continued)

*Primary Examiner* — Dani Fox
(74) *Attorney, Agent, or Firm* — Birch, Stewart, Kolasch & Birch, LLP

(57) ABSTRACT

Provided are an X-ray data processing apparatus and a method and a program therefor which can eliminate the influence of the phenomenon that the statistical variation of a count value after distribution is estimated differently from that at another position and can prevent the influence of correction from remaining. An X-ray data processing apparatus 200 that corrects the count value of X-ray intensity detected by a pixel array type detector includes a storage unit 220 to store a correspondence relationship of the shape and the position of a virtual pixel with respect to the shape and the position of an actual pixel, and a distribution unit 260 to distribute the count value of the actual pixel to the virtual pixel using a correspondence relationship in which randomness is provided to the stored correspondence relationship, and outputs the count value distributed to the virtual pixel as a correction result.

10 Claims, 15 Drawing Sheets

(56) References Cited

OTHER PUBLICATIONS

Broennimann et al., "The PILATUS 1M detector", Journal of Synchrotron Radiation, International Union of Crystallography, 2006, vol. 13, pp. 120-130.

Kraft et al., "Characterization and Calibration of PILATUS Detectors", IEEE Transaction on Nuclear Science, IEEE Service Center, New York, NY, US, vol. 56, No. 3, Jun. 1, 2009, pp. 758-764, XP011262661.

* cited by examiner

| Pixel size | Counts | Standard deviation |
|---|---|---|
| $100 \times 100\ \mu m^2$ | $n$ | $\sqrt{n}$ |
| $100 \times 150\ \mu m^2$ | $1.5 \times n$ | $\sqrt{1.5 \times n}$ |
| $\rightarrow pseudo\ pixel$ | $n$ | $2/3 \times \sqrt{1.5} \times \sqrt{n} = 0.82 \times \sqrt{n}$ |
| $150 \times 150\ \mu m^2$ | $1.5^2 \times n$ | $1.5 \times \sqrt{n}$ |
| $\rightarrow pseudo\ pixel$ | $n$ | $1/2.25 \times 1.5 \times \sqrt{n} = 0.67 \times \sqrt{n}$ |

FIG. 8

| Pixel size | Effective size | Effective / Geometrical Ratio |
|---|---|---|
| $100 \times 100\ \mu m^2$ | $96 \times 96\ \mu m^2$ | 0.9216 |
| $100 \times 150\ \mu m^2$ | $96 \times 146\ \mu m^2$ | 0.9344 |

FIG. 10

X-RAY DATA PROCESSING APPARATUS AND METHOD AND PROGRAM THEREFOR

BACKGROUND OF THE INVENTION

Field of the Invention

The present invention relates to an X-ray data processing apparatus and a method and program therefor.

Description of the Related Art

In a two-dimensional hybrid pixel array detector of a photon counting type, a plurality of pixels is arranged on a detection face, and readout chips are arranged therebehind to read count values detected by the pixels. Since the reading chip is smaller than a sensor, generally the plurality of reading chips is tiled on the sensor.

Because of the tiling, a gap is caused between the reading chips. As a measure for the gap, the pixel is formed in a shape and an arrangement matching the gap, differently from the pixels at the other positions. However, the raw count values are obtained from non-uniform pixel shapes and arrangements and a user cannot use the count values without processing.

Conventionally, the count values detected from pixels in a special shape and arrangement near the gap are corrected in the stage of data processing, and converted into count values of virtual pixels which are arranged regularly as if there is no gap. In this case, the count values are corrected by contribution according to a pixel area ratio (refer to Non-patent Literature 1, for example).

NON-PATENT LITERATURE

Non-patent literature 1: P. Kraft, A. Bergamaschi, Ch. Broennimann, R. Dinapoli, E. F. Eikenberry, B. Henrich, I. Johnson, A. Mozzanica, C. M. Schleputza, P. R. Willmotta, and B. Schmitta, "Performance of single-photon-counting PILATUS detector modules", Journal of Synchrotron Radiation" (2009), 16, 368-375

In the correction method as above, however, the count values obtained near the gap by the correction tends to be different from the count values at the other positions. In particular, in a low intensity X-ray measurement, this phenomenon appears notably. FIG. 14 is an X-ray image corrected by the conventional method. Here, in FIG. 14, contrast is intensified by image processing for easy understanding. In the image of FIG. 14, grid-like lines appear the gaps of the reading chips.

Such a phenomenon is caused because, since the count values become large in a pixel having a large area, relative statistic variation becomes small, and the influence of the small statistical variation remains when the count values thereof are divided simply according to the area ratio. In other words, in a pixel having a large area, the information of an X-ray incident position is lost, and there is caused influence of uniformly distributing the count values obtained there to the virtual pixels without processing.

SUMMARY OF THE INVENTION

The present invention has been achieved in view of such a situation and aims to provide an X-ray data processing apparatus and a method and program therefor which can reduce the influence of the phenomenon that the statistical variation of the count values after the distribution is estimated differently depending on the pixel shape and can perform the correction of the count value distribution appropriately.

(1) For achieving the above purpose, an X-ray data processing apparatus of the present invention is an X-ray data processing apparatus that corrects a count value of an X-ray detected by a pixel array type detector, including: a storage unit to store a correspondence relationship of a shape and a position of a virtual pixel with respect to a shape and a position of an actual pixel; and a distribution unit to distribute a count value of the actual pixel to the virtual pixel using a correspondence relationship in which randomness is provided to the stored correspondence relationship, wherein the count value distributed to the virtual pixel is output as a correction result.

By providing the randomness to the distribution of the count values in this manner, it is possible to eliminate the influence of the phenomenon that the statistical variation of the count values after the distribution is estimated differently depending on the pixel shape, and to perform the correction of the count value distribution appropriately.

(2) Further, in the X-ray data processing apparatus of the present invention, the distribution unit provides a random shift within a certain maximum width as the randomness to a boundary by which a count value of the actual pixel is divided according to an area ratio derived from the stored correspondence relationship. With such a calculation, it is possible to easily calculate the count value by providing the randomness.

(3) Further, in the X-ray data processing apparatus of the present invention, the distribution unit calculates the random shift using a random number not smaller than −1 and not larger than 1 which is obtained from a standard deviation estimated from the count value data of the actual pixel. Thereby, it is possible to provide an appropriate randomness according to the count value for each pixel.

(4) Further, in the X-ray data processing apparatus of the present invention, the actual pixel has an irregular shape and position according to a shape of a reading chip to read the count value detected by the actual pixel, and the virtual pixel has a regular shape and position, in the stored correspondence relationship. Thereby, it is possible to replace the pixels having the irregular shapes and positions between the chips by the ideal array of the pixels.

(5) Further, the X-ray data processing apparatus of the present invention uses a count value from which the influence of a charge share is eliminated according to the shape of the actual pixel, as the count value of the actual pixel. Thereby, it is possible to correct the count value in consideration of the influence of the charge share.

(6) Further, a method of the present invention is a method of X-ray data processing for correcting a count value of an X-ray detected by a pixel array type detector, including the steps of: calculating a correspondence relationship in which randomness is provided to a correspondence relationship of a shape and a position of a virtual pixel with respect to a shape and a position of an actual pixel; distributing a count value of the actual pixel to the virtual pixel using the calculated correspondence relationship; and outputting the count value distributed to the virtual pixel as a correction result. Thereby, it is possible to eliminate the influence of the phenomenon that the statistical variation of the count value after the distribution is estimated differently depending on the pixel shape, and to perform the correction of the count value distribution appropriately.

(7) Further, a program of the present invention is a program of X-ray data processing for correcting a count value of an X-ray detected by a pixel array type detector, causing a computer to execute processing including: calculating a correspondence relationship in which randomness is provided to a correspondence relationship of a shape and a position of a virtual pixel with respect to a shape and a position of an actual pixel; distributing a count value of the actual pixel to the virtual pixel using the calculated correspondence relationship; and outputting the count value distributed to the virtual pixel as a correction result. Thereby, it is possible to eliminate the influence of the phenomenon that the statistical variation of the count value after the distribution is estimated differently depending on the pixel shape, and to perform the correction of the count value distribution appropriately.

According to the present invention, it is possible to eliminate the influence of the phenomenon that the statistical variation of the count value after the distribution is estimated differently depending on the pixel shape, and to perform the correction of the count value distribution appropriately.

BRIEF DESCRIPTION OF THE DRAWINGS

FIG. 8 is a table to show a standard deviation of a count value with respect to a pixel size.

FIG. 10 is a table to show an example of an effective area with respect to a pixel shape.

DETAILED DESCRIPTION OF THE INVENTION

Best Modes for Carrying Out the Invention

Next, embodiments of the present invention will be explained with reference to the drawings. For easy understanding of explanation, the same reference number is attached to the same constituent in each of the drawings and duplicated explanation will be omitted.

First Embodiment (Entire Configuration)

Figure 1:
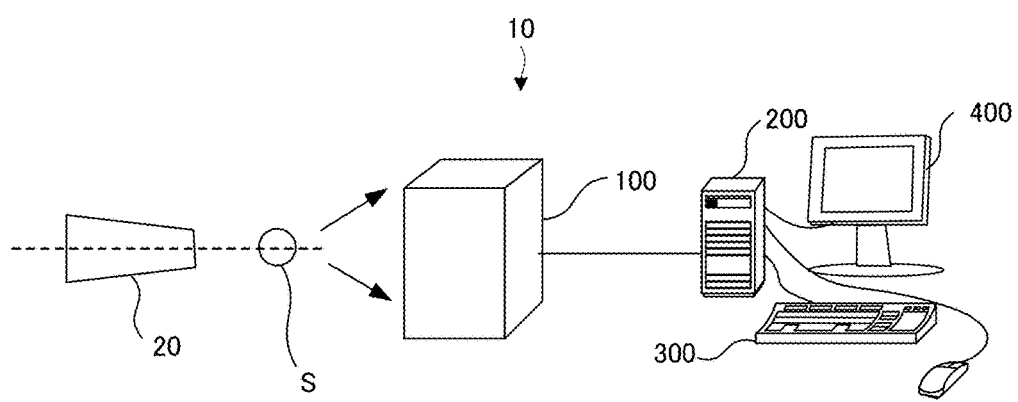
FIG. 1 is a schematic illustration to show a configuration example of an X-ray detection system of the present invention.

FIG. 1 is a schematic illustration to show a configuration example of an X-ray detection system 10. As shown in FIG. 1, the X-ray detection system 10 is configured with an X-ray source 20, a sample S, an X-ray detector 100, and an X-ray data processing apparatus 200.

The X-ray source 20 generates an X-ray by causing an electron flux radiated from a filament as a cathode, for example, to collide with a rotor target as a target. The X-ray radiated from the X-ray source 20 is a so-called point-focused X-ray beam.

A metal such as Mo or Cu, for example, is provided on the outer peripheral surface of the rotor target. When an electron collides with the Mo target, an X-ray is radiated including the MoKα-line (wavelength: 0.711 Å) of a characteristic line. When an electron collides with the Cu target, an X-ray is radiated including the CuKα-line (wavelength: 1.542 Å) of a characteristic line.

The sample S is supported by a sample support device. The X-ray detector 100 detects a diffraction X-ray or a fluorescent X-ray diffracted by the sample S, for example. The X-ray data processing apparatus 200 processes a detected count value and outputs the detection result. The X-ray detector 100 and the X-ray data processing apparatus 200 will be described below in detail.

(Configuration of the X-Ray Detector and the X-Ray Data Processing Apparatus)

Figure 2:
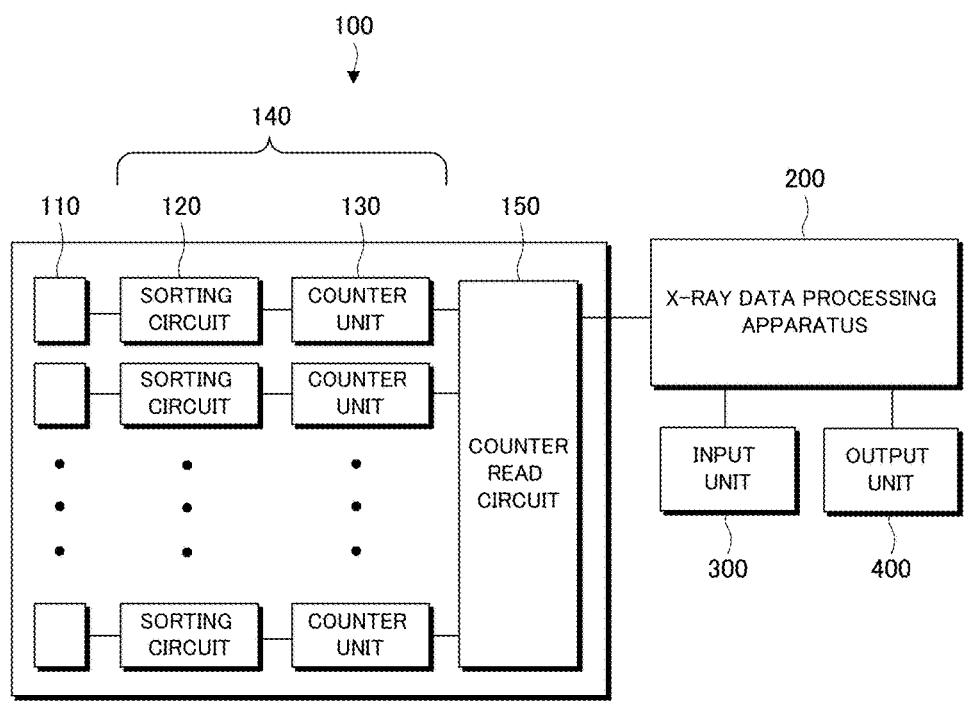
FIG. 2 is a block diagram to show configurations of an X-ray detector and an X-ray data processing apparatus.

FIG. 2 is a block diagram to show configurations of the X-ray detector 100 and the X-ray data processing apparatus 200. The X-ray detector 100 has a plurality of pixels 110 for X-ray reception and is a pixel array type two-dimensional semiconductor detector employing a photon counting method, for example. The whole detection surface configured with the plurality of pixels 110 works as a sensor, and reading chips 140 are tiled on the sensor. The plurality of pixels 110 is arrayed two-dimensionally, and, while the pixels are arrayed regularly having uniform shapes in principle, the pixel between the reading chips 140 has an irregular shape and position. Here, the detector is not limited to the two-dimensional semiconductor detector and may be a one-dimensional semiconductor detector.

The X-ray detector 100 has the plurality of pixels 110 on the surface, and has the reading chips 140 on the rear side of the pixels 110. Further, a sorting circuit 120 and a counter unit 130 are mounted on the reading chip 140. The sorting circuit 120 is connected to each of the plurality of pixels 110, and further the counter unit 130 is connected to each of the sorting circuits 120. A counter read circuit 150 is connected to each of the counter units 130.

The sorting circuit 120 sorts pulse signals from the pixel 110 for each X-ray wavelength and outputs the result. The counter unit 130 counts the number of signals sorted by the sorting circuit 120 for each wavelength. The counter unit 130 includes the same number of counter circuits as the number of sorts so as to cause the number of pulse signals sorted by the sorting circuit 120 to be counted for each of the sorts, for example. The output signal of the counter read circuit 150 is transmitted to the X-ray data processing apparatus 200 via a communication line as X-ray detection data separated by an energy threshold value.

The X-ray data processing apparatus 200 is a personal computer, for example. The personal computer is configured with a CPU for operational control, a memory for data storage, system software stored in a predetermined region within the memory, application program software stored in another predetermined region within the memory, and the like, for example.

The X-ray data processing apparatus 200 is connected with a keyboard or the like as an input unit 300 to receive user input. Further, the X-ray data processing apparatus 200 is connected with an output unit 400 such as a display and a printer. The output unit 400 outputs a measurement result according to an instruction from the X-ray data processing apparatus 200.

(Pixel Near a Gap)

Figure 3:
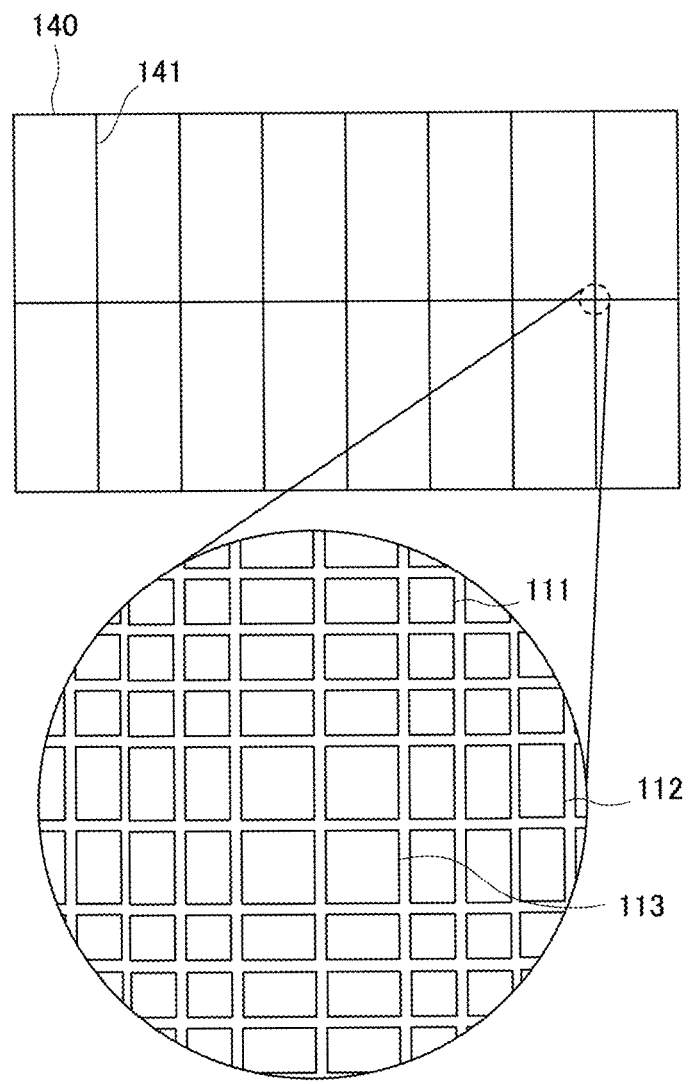
FIG. 3 is a schematic illustration to show the shape and arrangement of a pixel near a gap.

FIG. 3 is a schematic illustration to show the shape and arrangement of a pixel near a gap. The reading chip 140 is provided on the rear side of pixels 111 to 113 configuring the detection face. A gap 141 is formed between the reading chips 140 tiled as shown in FIG. 3. The large rectangular pixel 112 larger than the normal pixel 111 is provided near the gap along the edge of the reading chip 140, and the square pixel 113 larger than the normal pixel 111 is provided at a four-corner position of the gap.

(Configuration of the X-Ray Data Processing Apparatus)

Figure 4:
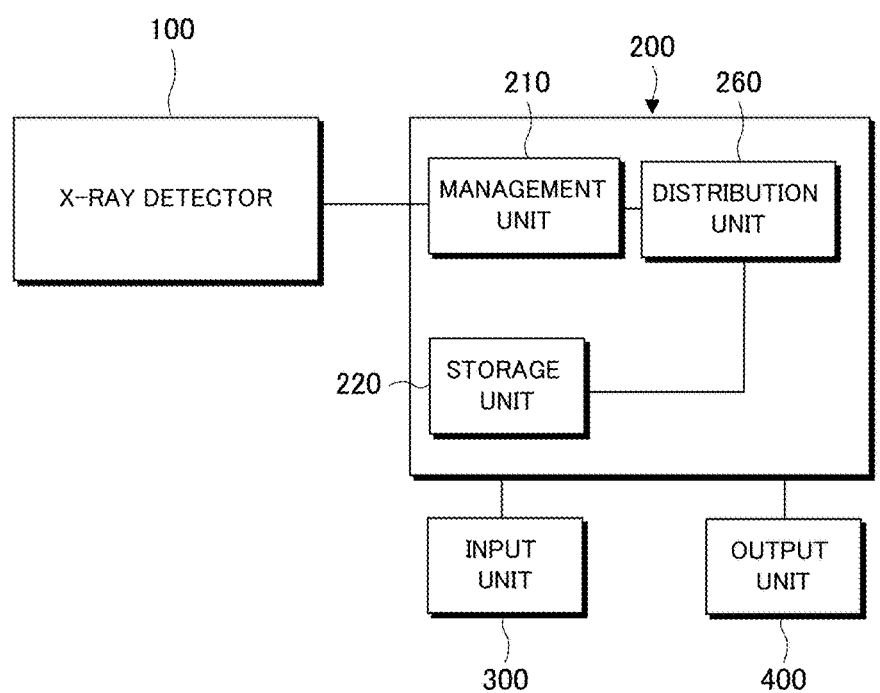
FIG. 4 is a block diagram to show a configuration of an X-ray data processing apparatus in a first embodiment.

FIG. 4 is a block diagram to show a configuration of the X-ray data processing apparatus 200. The X-ray data processing apparatus 200 includes a management unit 210, a storage unit 220, and a distribution unit 260, and corrects the X-ray count value detected by the X-ray detector 100.

The management unit 210 receives the count value detected by the X-ray detector 100 for each pixel and manages the count value. For example, the management unit 210 stores the X-ray count value detected in a pixel 110 in association with the address (i, j) of the pixel.

The storage unit 220 stores a correspondence relationship of the shape and position of the virtual pixel with respect to the shape and position of the actual pixel. It is preferable to store the correspondence relationship for the pixel near the gap. The virtual pixel is a pixel in which the shape and position of the actual pixel is replaced by an ideal shape and position, and has the same rules for the shape and position as the normal pixel among the actual pixels to be arranged regularly in a uniform shape.

The distribution unit 260 distributes the count values of the actual pixel to the virtual pixel using the correspondence relationship in which randomness is provided to the stored correspondence relationship. By providing the randomness to the count value distribution in this manner, it is possible to eliminate the influence of the phenomenon that the statistical variation of the count value after the distribution is estimated differently depending on the pixel shape, and to perform the correction of the count value distribution appropriately.

Preferably, as the randomness, the distribution unit 260 provides a shift within a maximum width of a value proportional to a standard deviation of the count value, to a boundary for dividing the count values of the actual pixel in an area ratio derived from the stored correspondence relationship. Thereby, it is possible to provide an appropriate randomness for each pixel according to the count value. That is, it is preferable to calculate the shift by multiplying a value which is obtained from a square root of the count value in the actual pixel multiplied by a certain coefficient, by a random number not smaller than −1 and not larger than 1. With the calculation like this, it is possible to easily calculate the count value provided with the randomness.

Specifically, a distribution ratio can be calculated as follows. For example, when the count value of the actual pixel 112 is distributed to a ⅔ region and a ⅓ region, the random shift $\sigma_1$ proportional to the standard deviation is provided to the area ratio as follows. Thereby, it is possible to expand the standard deviation by providing the randomness to the count value and also to store the total count. Here, "2" of $2/\sqrt{n}$ in formula (1) is a certain coefficient and the value may be changed for each measurement.

$$\frac{2}{3}:\frac{1}{3} \to \frac{2}{3} \pm \sigma_1 : \frac{1}{3} \mp \sigma_1 \qquad (1)$$

$$\therefore -\frac{2}{\sqrt{n}} < \sigma_1 < \frac{2}{\sqrt{n}}$$

(Operation of the X-Ray Data Processing Apparatus)

Figure 5:
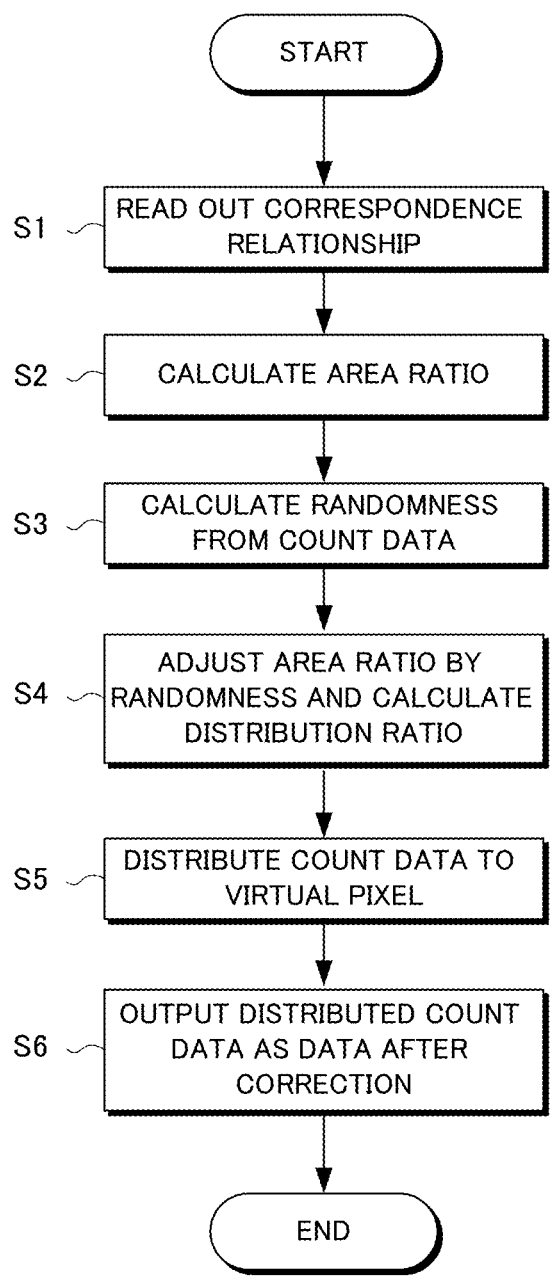
FIG. 5 is a flowchart to show the operation of the X-ray data processing apparatus in the first embodiment.

Next, the operation of the X-ray data processing apparatus 200 configured as above will be explained. FIG. 5 is a flowchart to show the operation of the X-ray data processing apparatus 200. First, for a special pixel between the reading chips, the correspondence relationship of the shape and position of the virtual pixel with respect to those of the actual pixel is read from the storage unit 220 (step S1).

Next, the area ratio for the distribution is calculated from the read correspondence relationship (step S2). Then, the randomness is calculated from the count value by obtaining of the standard deviation, for example (step S3). The area ratio is adjusted by the use of the obtained randomness and the distribution ratio is calculated (step S4), and the count value of the actual pixel is distributed to the virtual pixel in the calculated distribution ratio (step S5). Then, the distributed count value is output as the count value after correction, and the series of correction processing is terminated.

(Distribution from the Actual Pixel to the Virtual Pixel)

Figure 6:
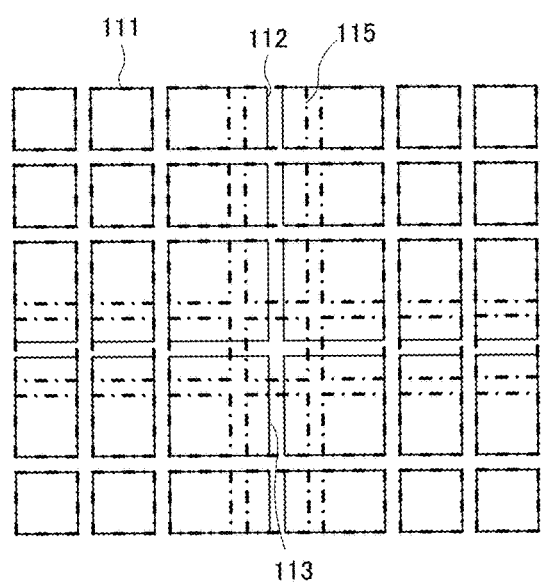
FIG. 6 is a schematic illustration to show a virtual pixel overlapped on an actual pixel.

FIG. 6 is a schematic illustration to show a virtual pixel 115 overlapped on the actual pixels 111 to 113. The actual pixels 111 to 113 include the normal pixel 111, and the special pixels 112 and 113 existing near the gap of the reading chips. The normal pixel 111 has the same shape and arrangement as the virtual pixel 115.

The rectangular special pixel 112 has the same length in one side as the normal pixel 111. The length of the other side is 1.5 times of the length of the normal pixel 111, and the special pixel 112 is different from the virtual pixel 115 in the size and the arrangement. Further, the square special pixel 113 has a length 1.5 times larger than the normal pixel 111 in any sides, and different from the virtual pixel 115 in the shape and position. The count values detected in these special pixels 112 and 113 are distributed to the overlapping virtual pixels 115.

Figure 7:
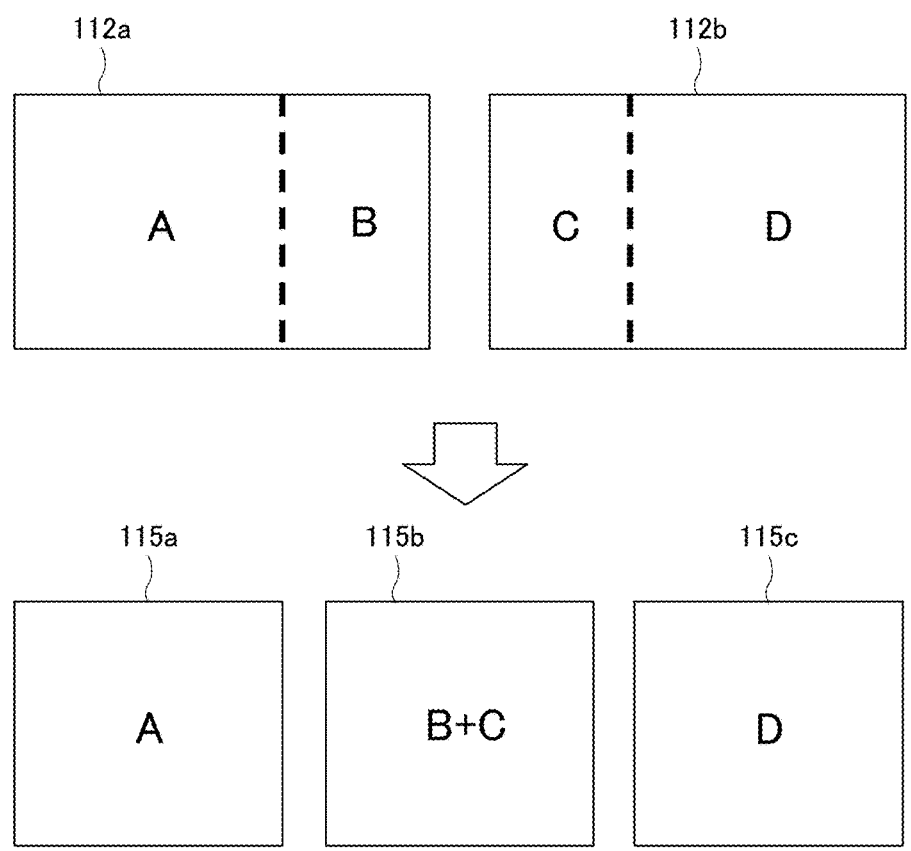
FIG. 7 is a schematic illustration to show count value distribution from an actual pixel to a virtual pixel.

FIG. 7 is a schematic illustration to show the count value distribution from the actual pixel to the virtual pixel. For example, a special actual pixel 112a in the upper part of FIG. 7 is divided into regions A and B along the long side in an area ratio of approximately 1:0.5, and a virtual pixel 115a in the lower part is provided with count value allocation in association with region A, and a virtual pixel 115b is provided with the count value allocation in association with region B. Further, a special actual pixel 112b in the upper part of FIG. 7 is divided into regions C and D along the long side in an area ratio of approximately 0.5:1, and the virtual pixel 115b in the lower part is provided with the count value allocation in association with region C and a virtual pixel 115c is provided with the count value allocation in association with region D.

In the distribution like this, since positional information is already lost when an event occurs in an expanded pixel as the special actual pixel 112a, freedom of the distribution ratio is allowable in a reasonable range if the total counts detected in the pixel is not changed. Accordingly, it becomes possible to provide the randomness in a maximum width proportional to the standard deviation in the distribution of the count value.

(Statistical Variation)

FIG. 8 is a table to show the standard deviation of the count values with respect to the pixel size. For example, when the count value is n in a pixel of 100×100 μm² corresponding to the normal actual pixel 111, the standard deviation is $\sqrt{n}$. Then, when the count value in a pixel of 100×150 μm² corresponding to the actual pixel 112 is 1.5×n, the standard deviation is $\sqrt{(1.5 \times n)}$. when the count value is distributed as it is to the virtual pixel 115 having an area ratio of 2/3, the standard deviation thereof becomes $2/3 \times \sqrt{1.5} \times \sqrt{n} = 0.82 \times \sqrt{n}$ and the statistical variation of the count values becomes smaller than that in the normal pixel 111, and therefore it is concluded that preferably the distribution is provided with a more randomness.

Further, when the count value is $1.5^2 \times n$ in a pixel of 150×150 μm² corresponding to the actual pixel 113, the standard deviation is $1.5 \times \sqrt{n}$. When the count value is distributed as it is to the virtual pixel 115 having an area ratio of 1/2.25, the standard deviation thereof becomes $1/2.25 \times 1.5 \times \sqrt{n} = 0.67 \times \sqrt{n}$, the statistical variation of the count values becomes smaller than that of the normal pixel 111, and therefore it is concluded that preferably the randomness is provided.

Second Embodiment

While the influence of charge share is not calculated in the above embodiment, distribution correction can be performed based on the count value from which the influence of the charge share is eliminated by the use of an effective area ratio.

Figure 9A:
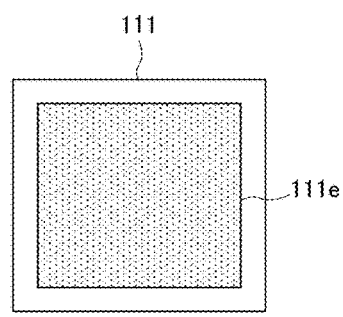
FIG. 9A and FIG. 9B are diagrams to show effective areas of a square and rectangular pixels, respectively.
Figure 9B:
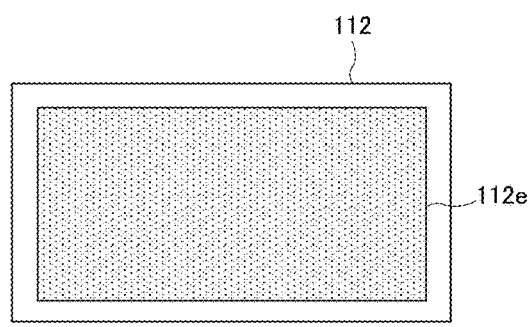

FIG. 9A and FIG. 9B are diagrams to show effective areas of the square and rectangular pixels, respectively. As shown in FIG. 9A and FIG. 9B, the size of the effective area in consideration of influence of the charge share is different depending on the pixel shape. This is because the influence of the charge share is caused only in the outer peripheral part and therefore the degree of the influence is different depending on the shape of a charge collection electrode. Since the region receiving the influence of the charge share in each pixel is a belt-like region within a certain distance from the edge, the effective area from which the influence of the charge share is subtracted becomes larger as the area of the pixel becomes larger.

FIG. 10 is a table to show an example of the effective area with respect to the pixel shape. Here, CuK 8.04 keV was used as the X-ray source and 6 keV was used as a threshold value. As shown in FIG. 10, the effective area of a pixel of 100×100 μm² was 96×96 μm², and the effective area ratio was 0.9216. On the other side, the effective area of a pixel of 100×150 μm² was 96×146 μm² and the effective area ratio was 0.9344, and the pixel of 100×150 μm² had a larger effective area ratio.

(Configuration of an X-Ray Data Processing Apparatus)

Figure 11:
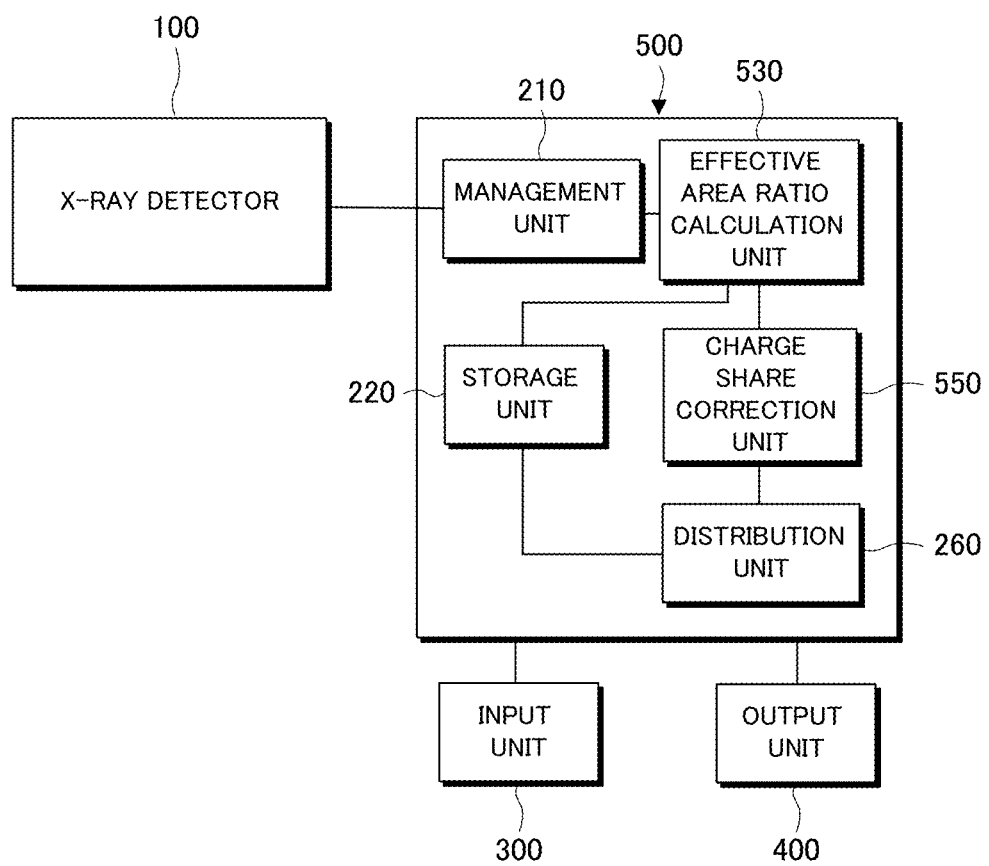
FIG. 11 is a block diagram to show a configuration of an X-ray data processing apparatus in a second embodiment.

FIG. 11 is a block diagram to show a configuration of an X-ray data processing apparatus 500. In the present embodiment, the storage unit 220 further stores data regarding the pixel of the X-ray detector 100 and data regarding the X-ray source 20 and a detection energy threshold value.

The data regarding the pixel includes the pixel size and shape and data expressing the distribution of charge spread which are preliminarily stored for each pixel. Further, the data regarding the X-ray source 20 and the detection energy threshold value is data expressing a condition when the X-ray detection system 10 is used. By using these kinds of data, it is possible to calculate the effective area ratio from which the influence of the charge share depending on the pixel property and shape is eliminated.

An effective area ratio calculation unit 530 calculates a ratio of detection ability under the influence of the charge share with respect to the original detection ability of the pixel as the effective area ratio of the pixel, using the data regarding the pixel and input data.

A charge share correction unit 550 corrects the managed count value using the calculated effective area ratio to estimate a true value. For a plurality of ray sources and a plurality of threshold values, the calculated effective area ratios are expressed by simultaneous equations, and the count value for each of the detection energy threshold values can be linearly transformed to a corrected value for each of the ray sources, by the use of the simultaneous equations.

(Operation of the X-Ray Data Processing Apparatus)

Figure 12:
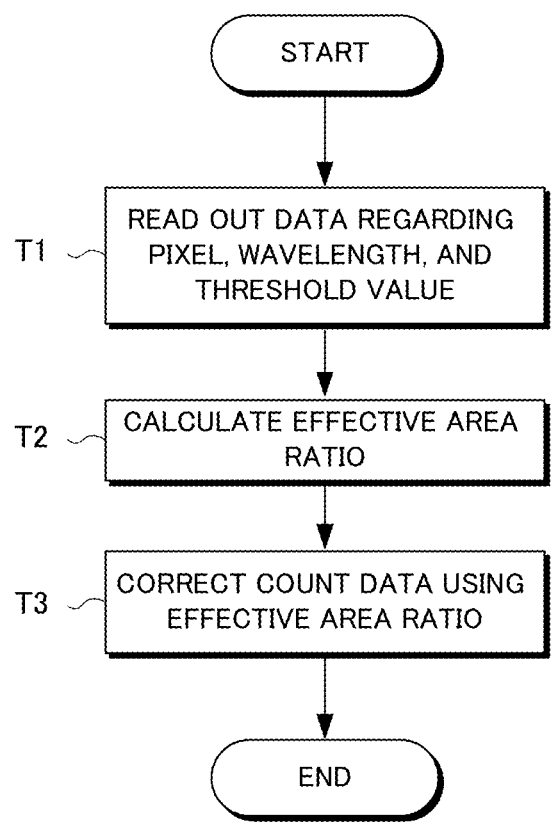
FIG. 12 is a flowchart to show the operation of the X-ray data processing apparatus in the second embodiment.

Next, the operation of the X-ray data processing apparatus 500 configured as above will be explained. FIG. 12 is a flowchart to show the operation of the X-ray data processing apparatus 500. First, the data regarding the pixel, the wavelength of the X-ray used in the measurement, and the threshold value are read from the storage unit 220 (step T1), the effective area ratio is calculated by the use of the data regarding the pixel and values of the wavelength and the threshold value (step T2). Then, the count value is corrected by the use of the effective area ratio (step T3). By the processing like this, it becomes possible to perform the correction using the effective area ratio.

Further, the count value after the correction obtained in the above processing is provided with the randomness and distributed from the actual pixel between the reading chips to the virtual pixel. This processing can be realized by the execution of steps S1 to S6 in the first embodiment. In this manner, it is possible to perform the count value distribution to the virtual pixel while eliminating the influence of the charge share.

(Correction and Calculation of the Effective Area Ratio Used in the Correction)

The effective area ratio after the influence of the charge share is eliminated has dependence on the threshold wavelength and the wavelength of the incident X-ray. The count of the X-ray having reached the pixel is estimated for each wavelength by the use of this wavelength dependence and each of the count values measured by a plurality of threshold values.

Two different wavelength are denoted by A and B, and two different appropriate threshold values are denoted by L and H. Further, the true number of photons in the X-rays reaching each pixel from the light sources having the wavelength A, B are denoted by $I_A$ and $I_B$ respectively, and the counts observed by the threshold values L and H are denoted by $I_L$ and $I_H$, respectively. When the pixel effective area ratio which is determined by the threshold value L and the wavelength A is expressed as $p_{LA}$, the relationship between the observed count and the true number of photons is obtained as in the following formula (2).

$$P \begin{pmatrix} I_A \\ I_B \end{pmatrix} = \begin{pmatrix} I_L \\ I_H \end{pmatrix} \quad (2)$$

$$\therefore P = \begin{pmatrix} p_{LA} & p_{LB} \\ p_{HA} & p_{HB} \end{pmatrix}$$

Here, when a matrix formed by the effective area ratios is denoted by P and the inverse matrix thereof is obtained, the following formula (3) is obtained, and therefore it becomes possible to obtain the counts by the ray sources A and B independently based on the count observed without distinguishing signals by the wavelength A, B.

$$\begin{pmatrix} I_A \\ I_B \end{pmatrix} = P^{-1} \begin{pmatrix} I_L \\ I_H \end{pmatrix} \quad (3)$$

When the spread of the charge in the semiconductor sensor is assumed to follow the normal distribution and the standard deviation thereof is assumed to be σ, and the length in one side of the pixel is denoted by d, the effective area ratio p is approximated as in the following formula (4) (if d≫σ).

$$p = \left(1 - 2 \times \sqrt{2\left(\frac{\sigma}{d}\right)^2} \times \operatorname{erfc}^{-1}\left(\frac{\lambda_{Th}}{\lambda} \times 2\right)\right)^2 \quad (4)$$

Here, λ indicates the wavelength of a target X-ray, and $\lambda_{Th}$ indicates a threshold wavelength in the detection circuit. When d≫σ does not hold, it is necessary to consider the effect of the four corners of the pixel.

The above X-ray detection system 10 can be used for separating a multi-color light source. For example, it is possible to obtain diffraction X-ray intensities $I_{Cu}$ and $I_{Mo}$ of a Cu light source and an Mo light source by the following formula (5) from the count values $I_H$ and $I_L$ of the X-ray which are separated respectively by a high-energy side threshold value and a low-energy side threshold value.

$$P \begin{pmatrix} I_{Cu} \\ I_{Mo} \end{pmatrix} = \begin{pmatrix} I_L \\ I_H \end{pmatrix} \quad (5)$$

$$\begin{pmatrix} I_{Cu} \\ I_{Mo} \end{pmatrix} = P^{-1} \begin{pmatrix} I_L \\ I_H \end{pmatrix}$$

$$\therefore P = \begin{pmatrix} p_{LCu} & p_{LMo} \\ p_{HCu} & p_{HMo} \end{pmatrix}$$

Example

Figure 13:
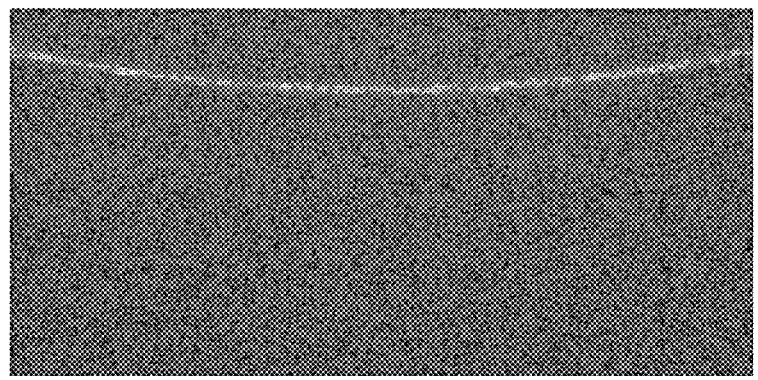
FIG. 13 is a diagram to show an X-ray image by correction in which randomness is added to a count value distribution.
Figure 14:
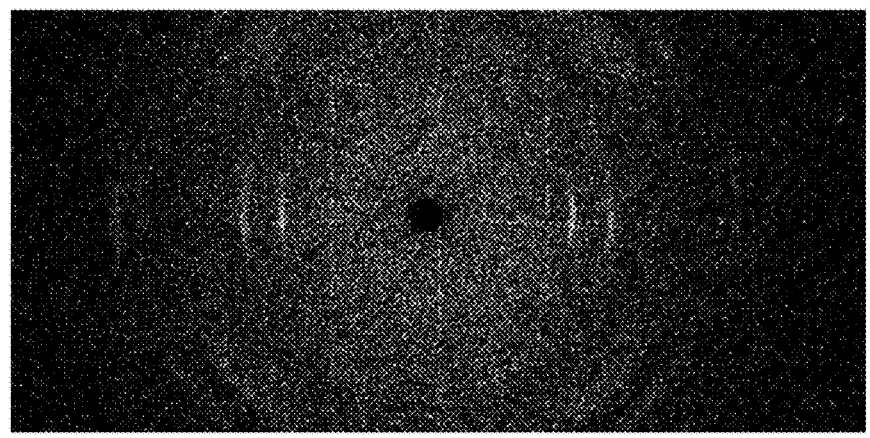
FIG. 14 is a diagram to show an X-ray image by conventional correction.

X-ray data was corrected by the use of the distribution method of the count values as described above. A Si sample was irradiated with an X-ray by the use of a Cr X-ray source, and a diffraction X-ray was observed. Correction by the effective area ratio was performed for a high side threshold value of 512 keV. Further, for the pixel between the reading chips, the count value to which the randomness was added was distributed to the virtual pixel. FIG. 13 is a diagram to show an X-ray image obtained by the correction in which the randomness was added to the count value distribution. As shown in FIG. 13, the gap between the reading chips did not appear in the X-ray image.

10 X-ray detection system
20 X-ray source
100 X-ray detector
110 pixel (actual pixel)
111-113 pixel (actual pixel)
112a actual pixel
112b actual pixel
115 virtual pixel
115a-115c virtual pixel
120 sorting circuit
130 counter unit
140 reading chip
141 gap
150 counter read circuit
200 X-ray data processing apparatus
210 management unit
220 storage unit
260 distribution unit
300 input unit
400 output unit
500 X-ray data processing apparatus
530 effective area ratio calculation unit
550 charge share correction unit

What is claimed is:

1. An X-ray data processing apparatus that corrects a count value of an X-ray detected by a pixel array type detector, comprising:
   a storage storing a correspondence relationship of a shape and a position of a virtual pixel with respect to a shape and a position of an actual pixel; and
   a processor distributing a count value of the X-ray received by the actual pixel to the virtual pixel using a correspondence relationship in which randomness is provided to the stored correspondence relationship, wherein
   the count value distributed to the virtual pixel is output as a correction result to generate an image based on the virtual pixels with the distributed count value.

2. The X-ray data processing apparatus according to claim 1, wherein
   the processor provides a random shift within a certain maximum width as the randomness to a boundary by which a count value of the actual pixel is divided according to an area ratio derived from the stored correspondence relationship.

3. The X-ray data processing apparatus according to claim 2, wherein
   the processor calculates the random shift using a random number not smaller than −1 and not larger than 1 which is obtained from a standard deviation estimated from the count value of the actual pixel.

4. The X-ray data processing apparatus according to claim 1, wherein
   in the stored correspondence relationship,
   the actual pixel has an irregular shape and position according to a shape of a reading chip to read a count value detected in the actual pixel, and
   the virtual pixel has a regular shape and position.

5. The X-ray data processing apparatus according to claim 1, wherein
   a count value from which influence of a charge share is eliminated according to a shape of the actual pixel is used as the count value of the actual pixel.

6. A method of X-ray data processing for correcting a count value of an X-ray detected by a pixel array type detector, comprising the steps of:
   calculating a correspondence relationship in which randomness is provided to a correspondence relationship of a shape and a position of a virtual pixel with respect to a shape and a position of an actual pixel;
   distributing a count value of the X-ray received by the actual pixel to the virtual pixel using the calculated correspondence relationship; and outputting the count value distributed to the virtual pixel as a correction result to generate an image based on the virtual pixels with the distributed count value.

7. A computer readable non-transitory storage medium to store a program processed by a processor, the program causing the processor to execute processing comprising:
calculating a correspondence relationship in which randomness is provided to a correspondence relationship of a shape and a position of a virtual pixel with respect to a shape and a position of an actual pixel;
distributing a count value of an X-ray received by the actual pixel to the virtual pixel using the calculated correspondence relationship; and
outputting the count value distributed to the virtual pixel as a correction result to generate an image based on the virtual pixel with the distributed count value.

8. The X-ray data processing apparatus according to claim 1, wherein
the count value distributed by the processor reduces a statistical variation of the count value after a count value distribution is estimated depending on the shape and position of the actual pixel different from the shape and position of the virtual pixel.

9. The X-ray data processing apparatus according to claim 1, further comprising:
a display that displays the output correction result.

10. The X-ray data processing apparatus according to claim 1, further comprising:
a printer that prints the output correction result.

* * * * *